(12) United States Patent
Gao et al.

(10) Patent No.: US 11,619,985 B2
(45) Date of Patent: Apr. 4, 2023

(54) OPERATIONAL CIRCUIT OF VIRTUAL CURRENCY DATA PROCESSING DEVICE, AND VIRTUAL CURRENCY DATA PROCESSING DEVICE

(71) Applicant: SHENZHEN MICROBT ELECTRONICS TECHNOLOGY CO., LTD., Shenzhen (CN)

(72) Inventors: Yang Gao, Shenzhen (CN); Yuefeng Wu, Shenzhen (CN); Hongyan Ning, Shenzhen (CN)

(73) Assignee: Shenzhen MicroBT Electronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/783,603

(22) PCT Filed: Apr. 12, 2021

(86) PCT No.: PCT/CN2021/086503
§ 371 (c)(1),
(2) Date: Jun. 8, 2022

(87) PCT Pub. No.: WO2021/249004
PCT Pub. Date: Dec. 16, 2021

(65) Prior Publication Data
US 2023/0004211 A1    Jan. 5, 2023

(30) Foreign Application Priority Data

Jun. 12, 2020 (CN) .......................... 202021079769.4

(51) Int. Cl.
*G06F 1/26* (2006.01)
*G06F 1/32* (2019.01)
*G06F 1/3296* (2019.01)

(52) U.S. Cl.
CPC ................................. *G06F 1/3296* (2013.01)

(58) Field of Classification Search
CPC ........ G06F 1/26; G06F 1/3296; G06F 15/163; G06Q 40/04; Y04S 10/50
See application file for complete search history.

(56) References Cited

U.S. PATENT DOCUMENTS

| 2013/0317906 A1 | 11/2013 | Morgenstern et al. |
| 2017/0072558 A1 | 3/2017 | Reynolds et al. |

FOREIGN PATENT DOCUMENTS

| CN | 101169635 A | 4/2008 |
| CN | 102298092 A | 12/2011 |
| CN | 212276452 U | 1/2021 |

OTHER PUBLICATIONS

International Search Report for Application No. PCT/CN2021/086503, dated Jul. 12, 2021.

(Continued)

*Primary Examiner* — Nitin C Patel
(74) *Attorney, Agent, or Firm* — Marshall, Gerstein & Borun LLP (57) ABSTRACT

An operational circuit of a virtual currency data processing device includes: at least two operational chip groups configured to operate within respective operating voltage threshold ranges of the operational chip groups to receive a communication signal which includes an issued task, perform calculations according to the issued task, and transmit a communication signal; a control module configured to operate within an operating voltage threshold range to transmit the communication signal which includes the issued task and receive the communication signal which includes the calculation result; at least two signal forwarding and electrical isolation modules, each of which is communicatively connected to and is configured to forward communication signals between the control module and the respective operational chip group, and isolate an operating voltage threshold of the operational chip groups to make the opera- (Continued)

tional chip groups and the control module capable of identifying communication signals sent by each other.

9 Claims, 5 Drawing Sheets

(56) References Cited

OTHER PUBLICATIONS

Written Opinion for Application No. PCT/CN2021/086503, dated Jul. 12, 2021.

OPERATIONAL CIRCUIT OF VIRTUAL CURRENCY DATA PROCESSING DEVICE, AND VIRTUAL CURRENCY DATA PROCESSING DEVICE

The present application claims the priority of Chinese patent application No. 202021079769.4 filed on Jun. 12, 2020 and entitled "Operational circuit of virtual currency mining machine, and virtual currency mining machine", which is incorporated herein by reference in its entirety.

TECHNICAL FIELD

The present application relates to the technical field of virtual currency data processing devices, and particularly, to an operational circuit of a virtual currency data processing device and a virtual currency data processing device.

BACKGROUND

A mining machine is a computing device dedicated for acquiring virtual currency. Operational chips used in mining machines generally adopt a series connection structure for signals and a series connection structure for power supply, so that control information enters the chips from a bottom chip (which is the operational chip closest to the ground GND in the series connection structure for power supply), and is delivered layer by layer through various operational chips to a top chip (which is the operational chip closest to the power input terminal Vcc). The power supply for the operational chips uses a conventional power supply mode of power supply for computer hosts, and uses a voltage of about 12V (some use a voltage of about 15V~18V).

Figure 1:
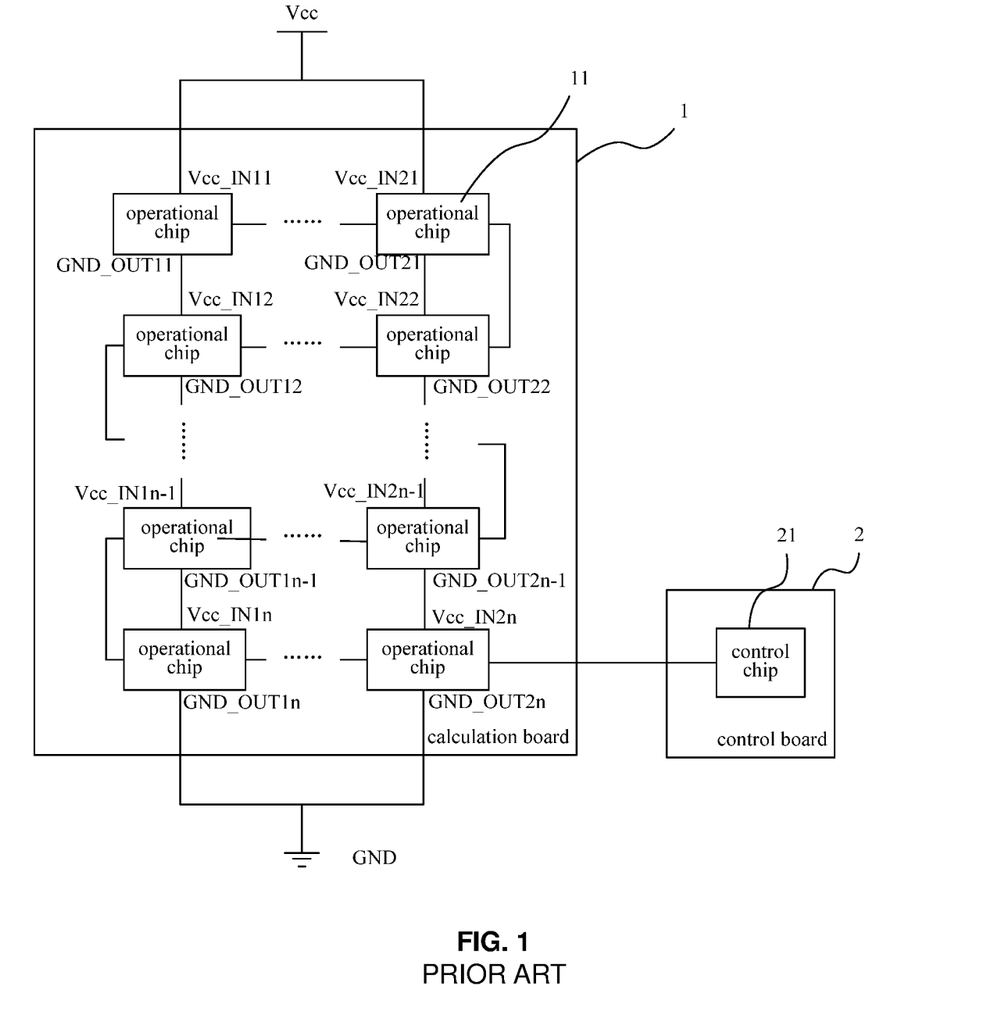
FIG. 1 is a schematic diagram illustrating an operational circuit of a conventional virtual currency mining machine.

FIG. 1 is a schematic diagram illustrating the structure of a conventional operational circuit. In terms of communication signals, various operational chips 11 in calculation board 1 are connected in series, and an operational chip 11 at an end of the series-connected operational chips 11 is communicatively connected to control chip 21 in control board 2. In terms of power supply, various operational chips 11 in the calculation board 1 are connected in a manner which include both series connections and parallel connections to form a multilayer series circuit for power supply of the operational chips. For example, various operational chips 11 may be grouped into several groups; in each group of operational chips 11, various operational chips 11 are connected in series between the power input terminal Vcc and the ground GND through respective power ports, that is, in each pair of adjacent operational chips 11, the negative terminal GND_OUT of a preceding operational chip 11 is electrically connected to the power supply terminal Vcc_IN of a following operational chip 11; the power supply terminal Vcc_IN of the operational chip 11 closest to the power input terminal Vcc is electrically connected to the power input terminal Vcc, and the negative terminal GND_OUT of the operational chip 11 closest to the ground GND is directly connected to the ground GND; various groups of the operational chips 11 are connected in parallel between the power input terminal Vcc and the ground GND. For example, as shown in FIG. 1, in the pair of series-connected adjacent operational chips 11 closest to the power input terminal Vcc on the left, the negative terminal GND_OUT11 of a preceding operational chip 11 is electrically connected to the power supply terminal Vcc_IN12 of a following operational chip 11, the power supply terminal Vcc_IN11 of the operational chip 11 closest to the power input terminal Vcc is electrically connected to the power input terminal Vcc; in the pair of series-connected adjacent operational chips 11 closest to the power input terminal Vcc on the right, the negative terminal GND_OUT21 of a preceding operational chip 11 is electrically connected to the power supply terminal Vcc_IN22 of a following operational chip 11, the power supply terminal Vcc_IN21 of the operational chip 11 closest to the power input terminal Vcc is electrically connected to the power input terminal Vcc; in the pair of series-connected adjacent operational chips 11 closest to the ground GND on the left, the negative terminal GND_OUT1$n$–1 of a preceding operational chip 11 is electrically connected to the power supply terminal Vcc_IN1$n$ of a following operational chip 11, the negative terminal GND_OUT1$n$ of the operational chip 11 closest to the ground GND is connected to the ground GND; in the pair of series-connected adjacent operational chips 11 closest to the ground GND on the right, the negative terminal GND_OUT2$n$–1 of a preceding operational chip 11 is electrically connected to the power supply terminal Vcc_IN2$n$ of a following operational chip 11, and a negative terminal GND_OUT2$n$ of the operational chip 11 closest to the ground GND is connected to the ground GND.

With such a circuit structure, the output current of the power supply keeps increasing with the continuous increase of the power of each single mining machine while the output voltage of 12V remains unchanged. As a result, the heat loss of the operational chips keeps increasing, the direct current loss of the calculation board where the operational chips are installed also increases significantly, and the efficiency of the power supply cannot be further increased.

For such conventional circuit structure, there are multiple layers of operational chips 11 connected in series between the power input terminal Vcc and the ground GND. With the present manufacturing technology, a power supply of 12V can support about 40 layers of series-connected operational chips. When a high-voltage power supply is used instead, the high-voltage power supply may support more layers of series-connected operational chips. For example, a power supply of 48V can support about 160 layers of series-connected operational chips 11. In that case, each calculation board 1 may include as many as four to five hundred operational chips 11. After power-on, voltage balance between operational chips 11 is hard to achieve, and operational chips 11 in various layers may have different voltage values, which may cause the operational chips 11 at some layers have too low voltages to start-up normally. Further, for the conventional circuit structure, a high-voltage power supply requires more layers of operational chips 11 to be connected in series, and the excessive number of operational chips 11 may further cause communication signals to pass through more operational chips 11 layer by layer before reaching the top chip (which is the operational chip 11 closest to the power input terminal Vcc), which increases signal delay and makes it difficult to achieve signal synchronization. Meanwhile, the signal quality may also worsen, resulting in a greatly-increased probability of communication error of the chip at an end of a communication link (which is the operational chip 11 closest to the power input terminal Vcc), which thereby reduces the stability of the virtual currency mining machine system.

SUMMARY

In view of the above, the present application provides a virtual currency data processing device and an operational circuit of the virtual currency data processing device, so as to increase the power supply efficiency when the power supply voltage is increased and to improve system stability of the virtual currency data processing device.

The technical scheme of the present application is as follows.

An operational circuit of a virtual currency data processing device includes:

at least two operational chip groups, configured to operate within respective operating voltage threshold ranges of the operational chip groups to receive a communication signal which includes an issued task, perform calculations according to the issued task, and transmit a communication signal which includes a calculation result;

a control module configured to operate within an operating voltage threshold range of the control module to transmit the communication signal which includes the issued task and receive the communication signal which includes the calculation result; and at least two signal forwarding and electrical isolation modules, each of the signal forwarding and electrical isolation modules is communicatively connected to a respective operational chip group and the control module, and is configured to forward communication signals between the control module and the operational chip group, and to isolate an operating voltage threshold of the operational chip groups from an operating voltage threshold of the control module to make the operational chip groups and the control module capable of identifying communication signals sent by each other.

A virtual currency data processing device includes the above operational circuit.

Compared with conventional techniques, the multilayer series circuit for power supply of a conventional operational chip is replaced with a series circuit for power supply of operational chip groups which is composed of multiple series-connected operational chip groups in the power supply path according to the operational circuit of the virtual currency data processing device of various embodiments of the present application. The circuit of the power supply path of the operational chips in each operational chip group adopts the same circuit structure as the multilayer series circuit for power supply of a conventional operational chip, except that the number of operational chips in each operational chip group is far smaller than the number of operational chips in the multilayer series circuit for power supply of a conventional operational chip. Meanwhile, a signal forwarding and electrical isolation module is communicatively connected between the control module and each operational chip group, and as a result, instead of all of operational chips in all of operational chip groups perform the same calculation task collectively, each operational chip group receives and executes a respective calculation task as an independent processing unit and returns calculation results when a high-voltage DC power supply is applied to the series circuit for power supply of the operational chip group, which can greatly improve power efficiency and reduce current heating loss. Meanwhile, in various embodiments of the present application, communication connections are established between the control module and each operational chip group which serves as an independent unit, and the number of operational chips in each operational chip group is much smaller than the total number of operational chips, thus the problem of delay among various operational chips in the operational chip groups can be solved, signal synchronization in the operational chip groups can be ensured, which can improve the signal quality in the operational chip groups, greatly reduce the probability of communication error of the operational chip groups, and improve stability. Meanwhile, in various embodiments of the present application, electrical isolation and data communication between the control module and each operational chip group can be realized by using the signal forwarding and electrical isolation module, thereby the operational chip group and the main control board can identify signals of each other even when the operational chip group and the main control board have different operating voltage thresholds.

In the drawings, names of components represented by various reference numerals are as follows:

1. calculation board;
11. operational chip
2. control board
21. control chip
31. operational chip group
311. operational chip subgroup
32. control module
33. signal forwarding and electrical isolation module
4. sub-control board
5. main control board
6. signal-electrical level conversion module

DETAILED DESCRIPTION

In order to make the purpose, technical solutions and advantages of the present application clearer, the present application will be further described in detail hereinafter with reference to the drawings and embodiments.

Figure 2:
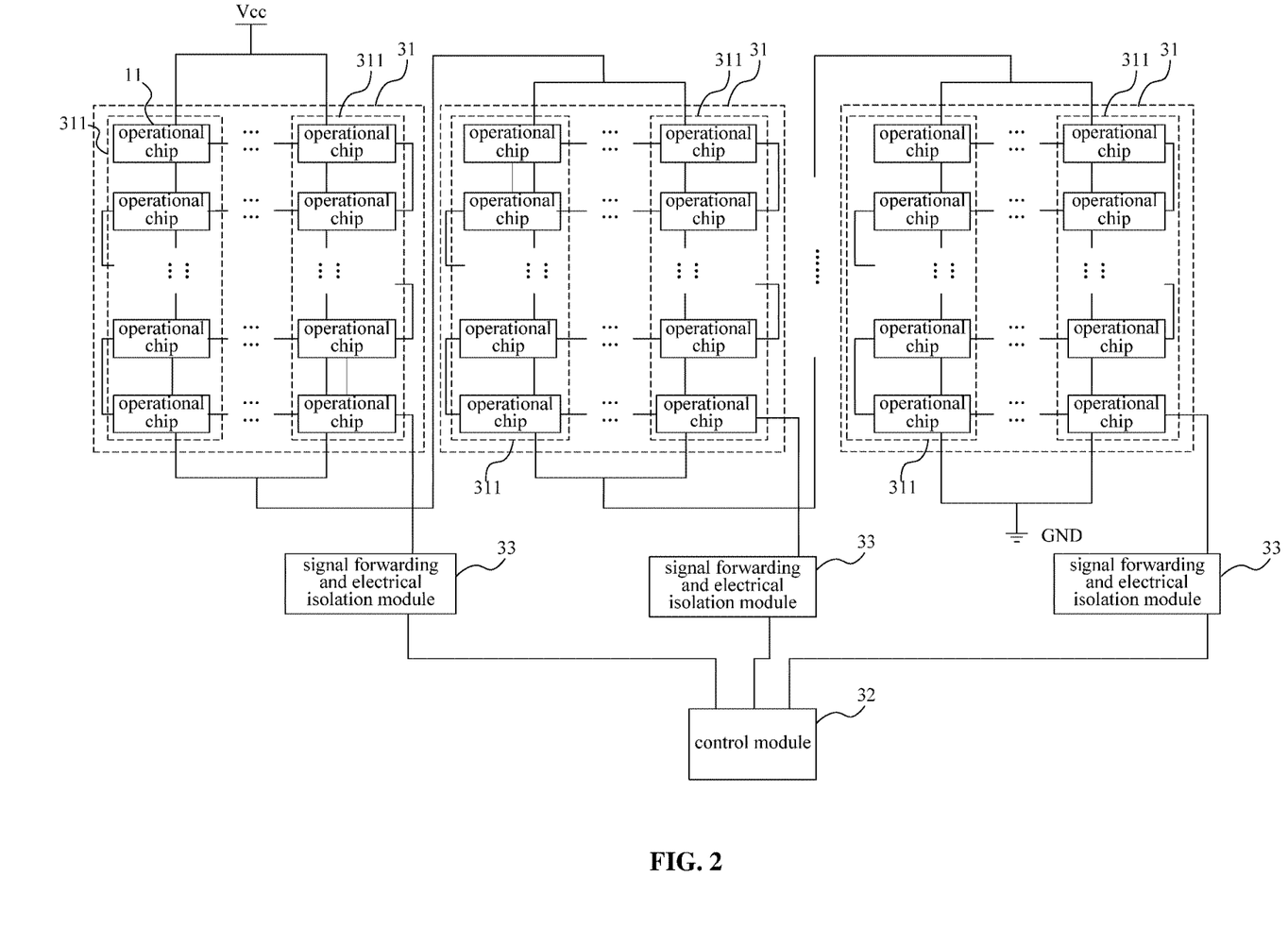
FIG. 2 is a schematic diagram illustrating an operational circuit of a virtual currency data processing device according to an embodiment of the present application.

The virtual currency data processing device in various embodiments of the present application may refer to, but not limited to, a virtual currency mining machine. As shown in FIG. 2, the operational circuit of a virtual currency data processing device according to an embodiment of the present application may include operational chip groups 31, a control module 32, a signal forwarding and electrical isolation module 33. There may be at least two operational chip groups 31. An operational chip group 31 is configured to operate within an operating voltage threshold range of the operational chip group 31 to receive a communication signal which includes an issued task, perform calculations according to the issued task, and transmit a communication signal which includes a calculation result. The control module 32 is configured to operate within an operating voltage threshold range of the control module 32 to transmit a communication signal which includes an issued task and receive a communication signal which includes a calculation result. There are at least two signal forwarding and electrical isolation modules 33. Each signal forwarding and electrical isolation module 33 is communicatively connected to a respective operational chip group 31. Each signal forwarding and electrical isolation module 33 is communicatively connected to the control module 32. The signal forwarding and electrical isolation module 33 is configured to forward communication signals between the operational chip group 31 and the control module 32, and isolate an operating voltage threshold of the operational chip group 31 from an operating voltage threshold of the control module 32 to make the operational chip group 31 and the control module 32 capable of identifying communication signals of each other.

In an embodiment, various operational chip groups 31 form a series circuit for power supply in a power supply path, i.e., various operational chip groups 31 are series-connected via respective power ports to form a series circuit for power supply of operational chip groups. That is, in a pair of adjacent operational chip groups 31, the negative terminal of a preceding operational chip group 31 is electrically connected to the power receiving terminal of a following operational chip group 31; the power receiving terminal of the operational chip group 31 closest to the power input terminal Vcc in the series circuit for power supply of operational chip groups is electrically connected to the power input terminal Vcc; and the negative terminal of the operational chip group 31 closest to the ground GND in the series circuit for power supply of operational chip groups is connected to the ground GND.

In the series circuit for power supply of operational chip groups, the operating voltage threshold ranges of various operational chip groups 31 are different. For example, in a series circuit for power supply of operational chip groups which is composed of four series-connected operational chip groups 31, the operating voltage threshold ranges of the four operational chip groups 31, in an order from the power input terminal Vcc to the ground GND, are approximately 36-48V, about 24-36V, about 12-24V, and about 0-12V respectively when connected to a power supply of 48V (i.e., the voltage at the power input terminal Vcc is 48V, and the voltage at the ground GND is 0V).

In an embodiment, the operating voltage threshold ranges of some or all of the operational chip groups 31 are different from the operating voltage threshold range of the control module 32, and the operating voltage threshold range of an operational chip group 31 may be the same as the operating voltage threshold of the control module 32.

In an embodiment, each operational chip group 31 may include multiple operational chips 11. Within each operational chip group 31, multiple operational chips 11 form at least one operational chip subgroup 311. Various operational chips 11 in each operational chip subgroup 311 form a series circuit for power supply in the power supply path, i.e., various operational chips 11 in each operational chip subgroup 311 are series-connected via respective power ports to form a series circuit for power supply of operational chips. That is, in each operational chip subgroup 311, the negative terminal of a preceding operational chip 11 of two adjacent operational chips 11 is electrically connected to the power receiving terminal of a following operational chip 11; various operational chip subgroups 311 form a parallel circuit for power supply in the power supply path.

In an embodiment, within each operational chip group 31, various operational chips 11 form a series circuit for signals in a signal path. The operational chip 11 at an end of the series circuit for signals is communicatively connected to the signal forwarding and electrical isolation module 33.

In an embodiment, each operational chip group 31 is installed on a respective calculation board of the virtual currency data processing device. The signal forwarding and electrical isolation module 33 is a sub-control board. The control module 32 is a main control board. For each sub-control board and an operational chip group 31 communicatively connected to the sub-control board, the operating voltage threshold range of the sub-control board is the same as the operating voltage threshold range of the operational chip group 31. Each sub-control board is communicatively connected to the main control board through an Ethernet port.

The sub-control board and the main control board may be implemented using a conventional technique, and is not elaborated herein.

In an embodiment, the signal forwarding and electrical isolation module 33 is a signal-electrical level conversion module. The signal-electrical level conversion module is configured to convert a communication signal sent by the operational chip group 31 into a communication signal within the input and output (IO) voltage domain of the control module 32 before forwarding the communication signal to the control module 32, and convert a communication signal sent by the control module 32 into a communication signal within the IO voltage domain of the operational chip group 31 before forwarding the communication signal to the operational chip group 31.

In an embodiment, each operational chip group 31 is installed on a respective calculation board of the virtual currency data processing device. Each signal-electrical level conversion module is installed on a respective calculation board of the virtual currency data processing device. The signal-electrical level conversion module in each calculation board is communicatively connected to the operational chip group 31 in that calculation board. The control module 32 is the main control board, and the main control board is communicatively connected to the signal-electrical level conversion module in each calculation board through a logical electrical interface with a matched electrical level.

In another embodiment, all of the operational chip groups 31 and all of the signal-electrical level conversion modules are installed on the same calculation board. The control module 32 is the main control board, and the main control board is communicatively connected to the signal-electrical level conversion module in each calculation board through a logical electrical interface with a matched electrical level.

Examples of the communication connection between the main control board and the signal-electrical level conversion module in each calculation board through a logical electrical interface with a matched electrical level include: (1) both the main control board and the signal-electrical level conversion module use CMOS logical electrical interfaces, and the main control board is communicatively connected to the signal-electrical level conversion module through the CMOS logical electrical interfaces; (2) both the main control board and the signal-electrical level conversion module use transistor-transistor-logic (TTL) logical electrical interfaces, and the main control board is communicatively connected to the signal-electrical level conversion module through the TTL logical electrical interfaces; (3) the main control board uses a CMOS logical electrical interface and the signal-electrical level conversion module uses a TTL logical electrical interface, and the main control board is communicatively connected to the signal-electrical level conversion module through the CMOS logical electrical interface and the TTL logical electrical interface; (4) the main control board uses a TTL logical electrical interface and the signal-electrical level conversion module employs a CMOS logical electrical interface, and the main control board is communicatively connected to the signal-electrical level conversion module through the TTL logical electrical interface and the CMOS logical electrical interface.

The signal-electrical level conversion module is implemented by a signal isolation chip or by signal isolation circuit. The signal isolation chip and the signal isolation circuit are conventional techniques in the field, thus are not be elaborated herein.

The operational circuit of the virtual currency data processing device of various embodiments of the present application are described in further detail hereinafter with reference to three examples.

Embodiment One

Figure 3:
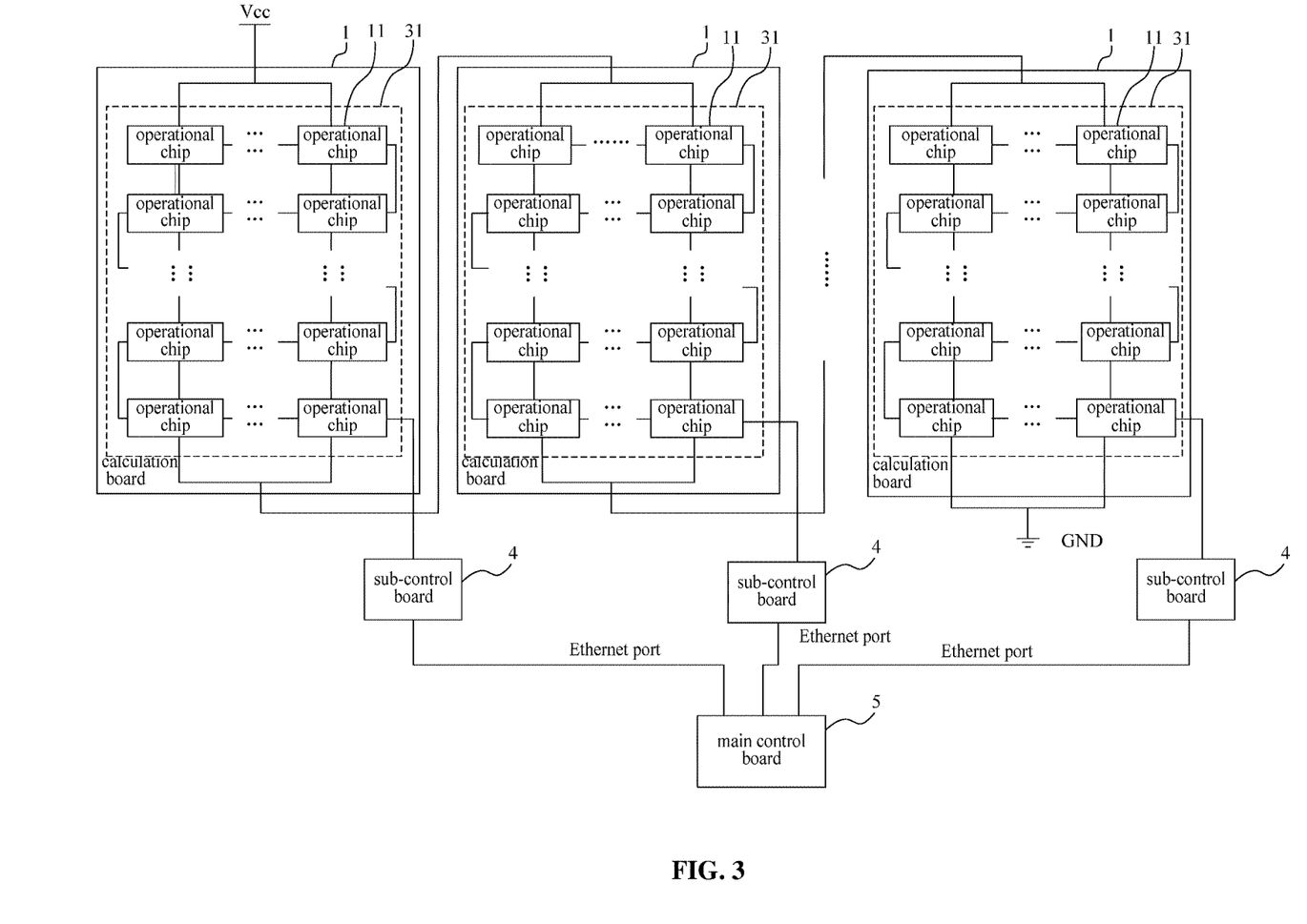
FIG. 3 is a schematic diagram illustrating an operational circuit of a virtual currency data processing device according to embodiment one of the present application.

As shown in FIG. 3, in embodiment one, at least two calculation boards 1 are involved. Each calculation board 1 includes an operational chip group 31. In various calculation boards 1, various operational chip groups 31 form a series circuit for power supply of operational chip groups in a power supply path. The power receiving terminal of the operational chip group 31 closest to the power input terminal Vcc is electrically connected to the power input terminal Vcc. The negative terminal of the operational chip group 31 closest to the ground GND is connected to the ground GND.

Each operational chip group 31 includes multiple operational chips 11. The operational chips 11 in each operational chip group 31 form multiple operational chip subgroups. Various operational chips 11 in each operational chip subgroup form a series circuit for power supply in the power supply path. In the power supply path, the various operational chip subgroups are connected in parallel between the power input terminal and the ground terminal of the calculation board 1 where the various operational chip subgroups are installed. In the description of this embodiment, the power input terminal and the ground terminal of the calculation board 1 are equivalent to the power receiving terminal and the ground terminal of the operational chip group 31 in the calculation board 1.

In each operational chip group 31, various operational chips 11 form a series circuit for signals in a signal path, that is, the various operational chips 11 in each operational chip group 31 are series-connected through respective communication ports.

In the operational chip group 31, the operational chip 11 at an end of the series circuit for signals is communicatively connected to a sub-control board 4, that is, the operational chip 11 at an end of the series circuit for signals in the calculation board 1 is communicatively connected to the sub-control board 4. The calculation board 1 may be communicatively connected to the sub-control board 4 through a CMOS logical electrical interface and/or a TTL logical electrical interface.

The operating voltage threshold of the sub-control board 4 is consistent with the operating voltage threshold of (the operational chip group 31 in) the calculation board 1 to which the sub-control board 4 is communicatively connected, thereby ensuring that 0-level communication signals and 1-level communication signals are consistent in the calculation board 1 (the operational chip group 31 therein) and the sub-control board 4, and ensuring that a communication signal sent by the sub-control board 4 to the operational chip group 31 can be identified by the operational chip group 31, and a communication signal sent by the operational chip group 31 to the sub-control board 4 can be identified by the sub-control board 4.

Each sub-control board 4 is communicatively connected to the main control board 5 through an Ethernet port.

Since the circuit structure of the Ethernet port includes a network transformer which makes the Ethernet port have the electrical isolation capability, thus ensure the sub-control board 4 and the main control board 5 can identify the communication signals sent by each other even when the sub-control board 4 and the main control board 5 have different operating voltage thresholds. For example, when the operating voltage threshold of the sub-control board 4 is 36~48V and the operating voltage threshold of the main control board 5 is 0~12V, communication signals sent by the sub-control board 4 via the Ethernet port can be identified by the main control board 5; meanwhile, communication signals sent by the main control board 5 via the Ethernet port can also be identified by the sub-control board 4.

In embodiment one, signals between the sub-control board 4 and the main control board 5 are electrically isolated, the sub-control board 4 and the main control board 5 have different reference levels, and reference ground levels of signals of the sub-control board 4 and the main control board 5 are different. In previous patents such as CN207531168U, a level shifter only performs electrical level conversion while signals at two ends of the level shifter are not isolated but have the same reference ground. Therefore, the level shifter, e.g., of the patent CN207531168U, cannot achieve electrical isolation.

Embodiment Two

Figure 4:
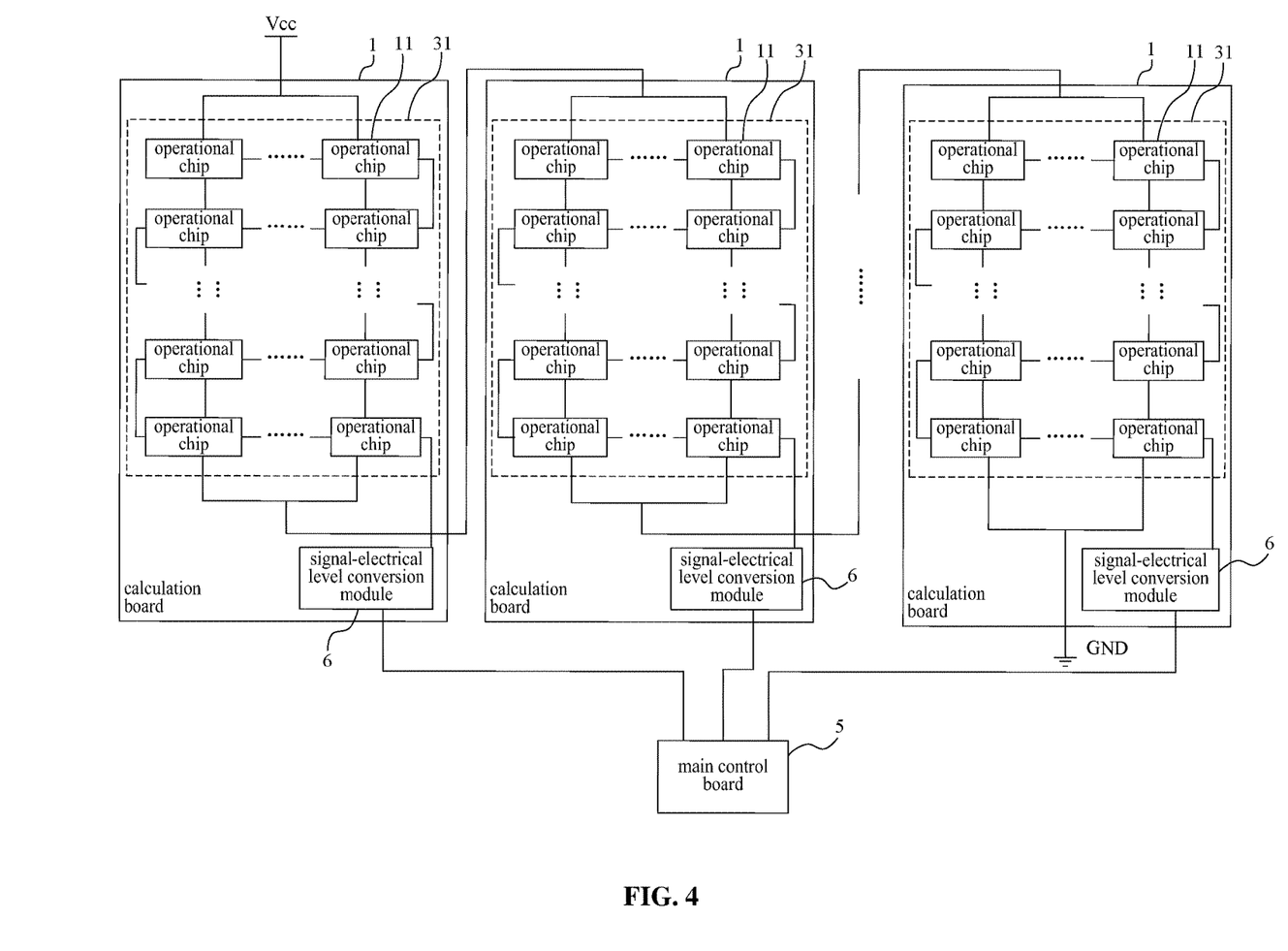
FIG. 4 is a schematic diagram illustrating an operational circuit of a virtual currency data processing device according to embodiment two of the present application.

As shown in FIG. 4, in embodiment two, at least two calculation boards 1 are involved. Each calculation board 1 includes an operational chip group 31 and a signal-electrical level conversion module 6. In various calculation boards 1, various operational chip groups 31 form a series circuit for power supply of operational chip groups in a power supply path. The power receiving terminal of the operational chip group 31 closest to the power input terminal Vcc is electrically connected to the power input terminal Vcc. The negative terminal of the operational chip group 31 closest to the ground GND is connected to the ground GND.

Each operational chip group 31 includes multiple operational chips 11. The operational chips 11 in each operational chip group 31 form multiple operational chip subgroups. Various operational chips 11 in each operational chip subgroup form a series circuit for power supply in the power supply path. That is, in each operational chip subgroup, the negative terminal of a preceding operational chip 11 of two adjacent operational chips 11 is electrically connected to the power receiving terminal of a following operational chip 11. In the power supply path, the various operational chip subgroups are connected in parallel between the power input terminal and the ground terminal of the calculation board 1 to which the various operational chip subgroups belong. In the description of this embodiment, the power input terminal and the ground terminal of the calculation board 1 are equivalent to the power receiving terminal and the ground terminal of the operational chip group 31 in the calculation board 1.

In each operational chip group 31, various operational chips 11 form a series circuit for signals in a signal path, that is, the various operational chips 11 in each operational chip group 31 are series connected through respective communication ports.

In the operational chip group 31, the operational chip 11 at an end of the series circuit for signals is communicatively connected to the signal-electrical level conversion module 6.

The signal-electrical level conversion module 6 is communicatively connected to the main control board 5 through a CMOS electrical level interface, i.e., the communication connection between the calculation board 1 and the main control board 5 is implemented using a CMOS electrical level interface.

The signal-electrical level conversion module 6 is configured to convert communication signals within an operating voltage threshold range sent by the operational chip group 31 into communication signals within the operating voltage threshold range of the main control board 5 before forwarding the communication signals to the main control board 5, and convert communication signals within an operating voltage threshold range sent by the main control board 5 into communication signals within the operating voltage threshold range of the operational chip group 31 before forwarding the communication signals to the operational chip group 31.

The signal-electrical level conversion module 6 is implemented by a signal isolation chip or by signal isolation circuit. The signal isolation chip or signal isolation circuit may be implemented by the calculation board 1 or by the main control board 5.

In embodiment two, the signal-electrical level conversion module 6 has a matched signal electrical level with the communication connection terminal of the operational chip group 31 and the operational chip group 31, and has a matched signal electrical level with the main control board 5 and the communication connection terminal of the main control board 5, and the communication connection terminals at two ends of the signal-electrical level conversion module 6 are electrically isolated. In previous patents such as CN207531168U, a level shifter only performs level conversion, signals at two ends of the level shifter are not isolated but have the same reference ground. Therefore, the level shifter, for example of the patent CN207531168U, cannot achieve electrical isolation.

Embodiment Three

Figure 5:
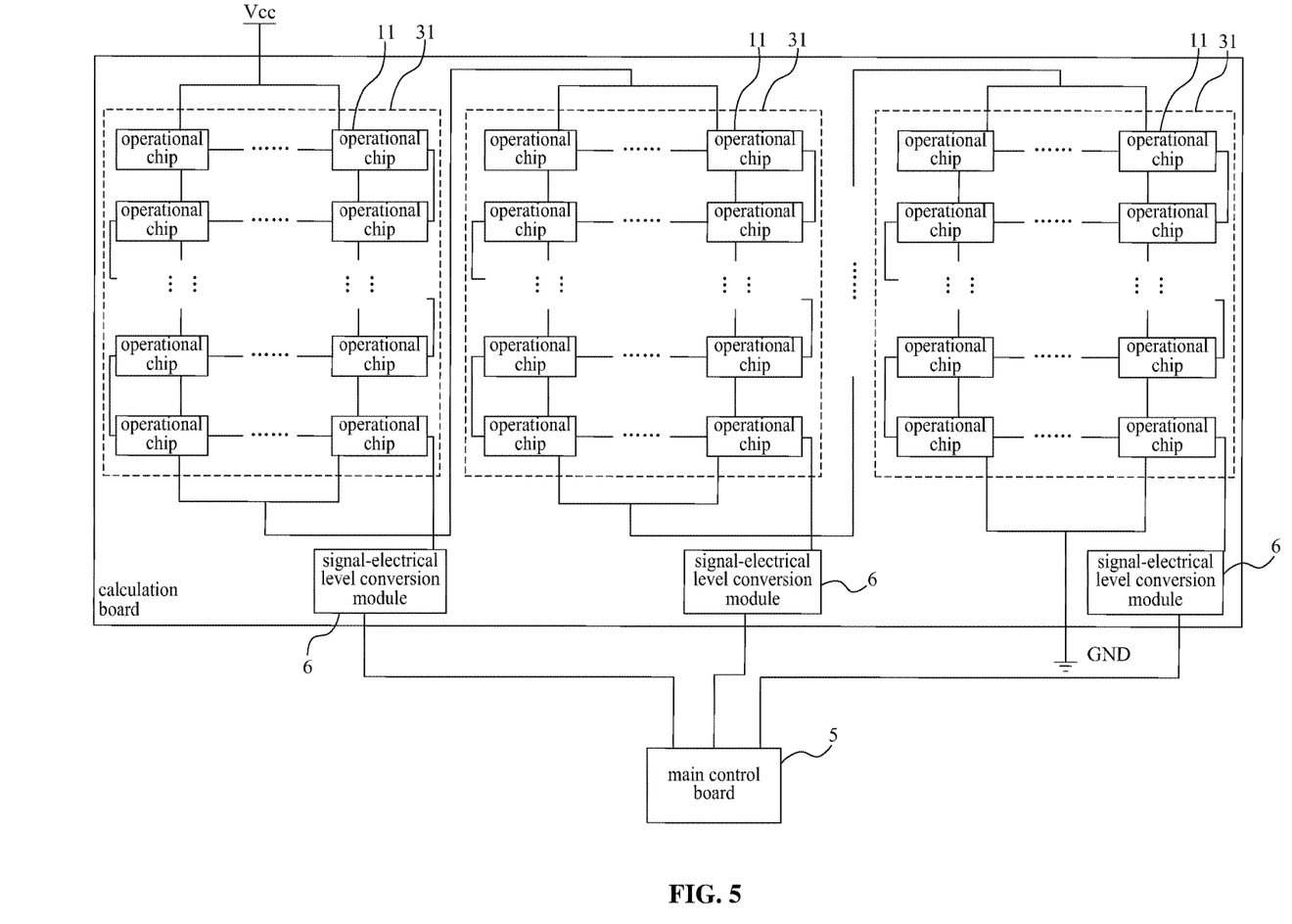
FIG. 5 is a schematic diagram illustrating an operational circuit of the virtual currency data processing device according to embodiment three of the present application.

As shown in FIG. 5, embodiment three has the same circuit structure as embodiment two, except that all of operational chip groups 31 and all of signal-electrical level conversion modules 6 in embodiment three are installed on the same calculation board 1.

Various embodiments of the present application further provide a virtual currency data processing device which includes the operational circuit as in the above embodiments.

Compared with conventional techniques, the multilayer series circuit for power supply of a conventional operational chip is replaced with a series circuit for power supply of operational chip groups which is composed of multiple series-connected operational chip groups in the power supply path according to the operational circuit of the virtual currency data processing device of various embodiments of the present application. The circuit of the power supply path of the operational chips in each operational chip group adopts the same circuit structure as the multilayer series circuit for power supply of a conventional operational chip, except that the number of operational chips in each operational chip group is far smaller than the number of operational chips in the multilayer series circuit for power supply of a conventional operational chip. Meanwhile, a signal forwarding and electrical isolation module is communicatively connected between the control module and each operational chip group, and as a result, instead of all of operational chips in all of operational chip groups perform the same calculation task collectively, each operational chip group receives and executes a respective calculation task as an independent processing unit and returns calculation results when a high-voltage DC power supply is applied to the series circuit for power supply of the operational chip group, which can greatly improve power efficiency and reduce current heating loss. Meanwhile, in various embodiments of the present application, communication connections are established between the control module and each operational chip group which serves as an independent unit, and the number of operational chips in each operational chip group is much smaller than the total number of operational chips, thus the problem of delay among various operational chips in the operational chip groups can be solved, signal synchronization in the operational chip groups can be ensured, which can improve the signal quality in the operational chip groups, greatly reduce the probability of communication error of the operational chip groups, and improve stability. Meanwhile, in various embodiments of the present application, electrical isolation and data communication between the control module and each operational chip group can be realized by using the signal forwarding and electrical isolation module, thereby the operational chip group and the main control board can identify signals of each other even when the operational chip group and the main control board have different operating voltage thresholds.

The foregoing descriptions are merely some of preferred embodiments of the present application and are not intended for limiting the present application. Any modification, equivalent replacement, improvement, etc. made within the spirit and principle of the present application shall fall within the protection scope of the present application.

What is claimed is:

1. An operational circuit of a virtual currency data processing device, comprising:
    at least two operational chip groups, configured to operate within respective operating voltage threshold ranges of the operational chip groups to receive a communication signal which includes an issued task, perform calculations according to the issued task, and transmit a communication signal which includes a calculation result;
    a control module configured to operate within an operating voltage threshold range of the control module to transmit the communication signal which includes the issued task and receive the communication signal which includes the calculation result; and
    at least two signal forwarding and electrical isolation modules, each of the signal forwarding and electrical isolation module is communicatively connected to the control module and a respective operational chip group, and is configured to forward communication signals between the control module and the operational chip group, and isolate an operating voltage threshold of the operational chip groups from an operating voltage threshold of the control module to make the operational chip groups and the control module capable of identifying communication signals sent by each other.

2. The operational circuit according to claim 1, wherein the operational chip groups compose a series circuit for power supply in a power supply path.

3. The operational circuit according to claim 1, wherein each of the operational chip groups comprises a plurality of operational chips;
    in each of the operational chip groups, the operational chips compose at least one operational chip subgroup;

operational chips in each of the operational chip subgroup compose a series circuit for power supply in a power supply path;

the operational chip subgroups compose a parallel circuit for power supply in the power supply path.

4. The operational circuit according to claim 3, wherein in each of the operational chip groups, operational chips compose a series circuit for signals in a signal path;

an operational chip at an end of the series circuit for signals is communicatively connected to the signal forwarding and electrical isolation module.

5. The operational circuit according to claim 1, wherein each of the operational chip groups is installed on a respective calculation board of the virtual currency data processing device;

the signal forwarding and electrical isolation module is a sub-control board; the control module is a main control board;

for each sub-control board and an operational chip group which is in communication with the sub-control board, an operating voltage threshold range of the sub-control board is the same as an operating voltage threshold range of the operational chip group;

each sub-control board is communicatively connected to the main control board through an Ethernet port.

6. The operational circuit according to claim 1, wherein the signal forwarding and electrical isolation module is a signal-electrical level conversion module; the signal-electrical level conversion module is configured to convert a communication signal sent by an operational chip group into a communication signal within an input and output (IO) voltage domain of the control module and forward the communication signal within the IO voltage domain of the control module to the control module, and convert a communication signal sent by the control module into a communication signal within an IO voltage domain of an operational chip group and forward the communication signal within the IO voltage domain of the operational chip group to the operational chip group.

7. The operational circuit according to claim 6, wherein each of the operational chip groups is installed on a respective calculation board of the virtual currency data processing device;

each signal-electrical level conversion module is installed on a respective calculation board of the virtual currency data processing device;

a signal-electrical level conversion module in each calculation board is communicatively connected to an operational chip group in the calculation board;

the control module is a main control board, and the main control board is communicatively connected to the signal-electrical level conversion module in each calculation board through a logical electrical interface with a matched electrical level.

8. The operational circuit according to claim 7, wherein the operational chip groups and signal-electrical level conversion modules are installed on the same calculation board;

the control module is a main control board, and the main control board is communicatively connected to the signal-electrical level conversion module in each calculation board through a logical electrical interface with a matched electrical level.

9. A virtual currency data processing device, comprising: the operational circuit according to claim 1.

* * * * *